Eberhard Borges
INVENTOR.

BY

Karl G. Ross
Attorney

Eberhard Borges
INVENTOR.

BY Karl F. Ross
Attorney

# United States Patent Office 3,433,321
Patented Mar. 18, 1969

3,433,321
METHOD OF AND APPARATUS FOR DETECTING FAULTS IN SUBSURFACE STRATA
Eberhard Borges, 78 Spillheide,
43 Essen-Heidhausen, Germany
Filed Jan. 19, 1967, Ser. No. 614,384
Claims priority, application Germany, Feb. 3, 1966,
B 85,652
U.S. Cl. 181—.5          9 Claims
Int. Cl. G01v 1/13

ABSTRACT OF THE DISCLOSURE

A system for the detection and evaluation of structural faults, inclusions, crevices, clefts and defect structures in subsurface strata (such as rock strata) in mountainous regions, coal and ore veins or seams and the like whereby one or more seismic-wave sources are arrayed along one side of the stratum to be evaluated and one or more seismic-wave receivers are disposed along an opposite side of the stratum with respect to the suspected fault, and analysis is carried out by detecting the energy of the direct seismic waves passing from the sources to the receivers. These direct waves are attenuated or blocked by the presence of fault or defect structures to an extent greater than the normal attenuation; the latter is measured to serve as a reference. An apparatus for detecting seismic waves of this type which includes a rod anchored via an expansion sleeve in a bore provided in the strata and clamped to a seismic-wave detector (e.g. a Geophone).

My present invention relates to a method of and an apparatus for the detection and evaluation of defect structures in subsurface strata and, more particularly, for the determination of the presence and extent of slip and transverse offset (i.e. geological faults), crevices, strata defects, domes, unusual rock formations and the like, especially in mountainous regions, mining locations (e.g. the walls of mine tunnels and shafts) and ore and coal seams and veins.

Conventional methods for detecting and evaluating subsurface structures and determining the presence and extent of geological faults and strata defects or irregularities have generally made use of reflective seismic waves. In accordance with this procedure, one or more receiving devices are disposed about a seismic-wave generator (e.g. a charge of explosives in an exploratory bore) or a plurality of such exploratory bores sustain respective detonations while a single receiver or a plurality of receivers pick up the seismic wave reflected from the stratum of interest. While this procedure, which makes use of seismic generators and receivers located above the stratum or at one side thereof, is effective to determine the nature of the various strata, depending, of course, on the wave propagation rates and elasticity or compressibility of the strata, it has been found that these reflective methods are inadequate when seismic techniques are desired for the detection or evaluation of faults in stratum. For example, reflective waves are detected and studied, using the travel time in the stratum by timing the period between reception and discharge and the orientation of the waves. When reflective methods have been attempted to evaluate the presence of inclusions, small slip or transverse faults, crevices and cracks in seams of coal, for example, the system is practically incapable of responding effectively.

I have discovered that this inability to effectively use reflective seismic methods derives at least in part from the insufficient contrast between waves reflected from faults and waves reflected from strata boundaries. Furthermore, the reflections from strata boundaries even remote from the suspected fault are even more pronounced than any reflections from the faults themselves.

It is, therefore, the principal object of the present invention to provide an improved method of detecting and evaluating subsurface faults and defect structures whereby even relatively small defects can be readily determined and the extent of such defects evaluated.

Another object of the present invention is to provide a method of evaluating accurately the location, extent and nature of relatively small defects or defects which have hitherto been nonresponsive to reflective seismic-wave exploration.

Still another object of my invention is to provide a method of and apparatus for the relatively inexpensive and rapid determination of the location, orientation and extent of geological faults and other strata defects.

Yet another object of the invention is to provide a method of evaluating the nature of the interior of coal veins and ore seams at relatively low cost, accurately and with rapidity.

These objects and others which will become apparent hereinafter are attained, in accordance with the present invention, by providing a method whereby direct seismic waves are transmitted from one side of the rock stratum containing a suspected fault and are received on the other side and the energy of the waves evaluated to determine the presence, absence or nature of the rock faults, the normal energy loss within the stratum being used as a reference upon a similar direct transmission through a region believed to be substantially fault free. Thus, according to this invention, at one side of the suspected fault or defect, from one or more seismic wave-generating points or locations, seismic waves are directed into the stratum toward the suspected fault and working the other side of the fault; at this opposite side of the fault I provide one or more seismic-wave reception stations or "registration points" each provided with a respective seismic-wave analyzer responsive to the energy of the wave for providing a signal proportional to this energy. The principle of this invention is based upon my discovery that a surprisingly significant contrast exists between seismic-wave signals transmitted directly by a rock stratum and seismic signals intercepted or severely attenuated by the defect therein. Furthermore, even from minimal standardization measurements, it is possible to determine the normal attenuation rate of the energy of the wave in a particular rock stratum and extrapolate it to the thickness of the strata between the seismic-wave source and the seismic-wave receiver. Another surprising discovery is that certain seismic waves can be substantially completely blocked, intercepted or interrupted by the presence of a fissure or crevice and can be so deflected by a fault that a direct path between the seismic-wave generator and the receiver is precluded for a particular seismic wave. The energy detected at the receivers, therefore, is directly related to the propagation of the wave over a minimum or straight-line distance without interception or deflection.

I have also found that a tectonically stressed or faulted zone has a characteristic absorption of seismic energy which permits such zones to be distinguished from the normal rock strata. Thus the density of the rock stratum forwardly of and rearwardly of a defect is sharply different from the density within the defect zone. In fact, the defect zone is apparently less compact and of a crumbly nature increasing the energy absorption much as does a loose packing in a sound absorber. The greatest transmissivity of the stratum is, of course, through rock areas of high compressive strength and modulus whereas the lowest transmissivity and greatest absorptivity (for longitudinal seismic waves) are the looser and less resilient regions.

Still more surprisingly, it is possible, in accordance with this invention, to evaluate interlayer zones (e.g. between a coal seam and a surrounding rock stratum) with boundary-layer waves while compressional waves (e.g. longitudinal or transverse body waves) are best used for the study of faults within a particular coal seam structure. Since the incident waves of the present invention reach the registration points or the receivers much faster than the reflected waves do, blocked and interrupted waves, each receiver may be made responsive to this short time phase, and exclude spurious reflected waves. Moreover, the reception of waves at a certain angular orientation between the generators and the receivers may permit one to ascertain, as will be set forth in greater detail below, the orientation of a fault plane or other defects.

I have also discovered that small fractures or inclusions within the strata may be prevented from affecting the seismic waves by tuning the wavelength of these seismic sources such that it is substantially greater than the width of the defects in the direction of propagation of these waves.

According to a more specific feature of this invention, each of the seismic-wave sources is in the form of a bore drilled into a surface of the stratum on one side of the suspected fault, the bores having a mutual spacing; it is preferably possible to provide one or more charges, which are relatively long and narrow, nevertheless at a shallow depth at a measured distance. In the surface of the stratum opposite the seismic generators across the suspected fault, I provide a plurality of spaced-apart seismic-wave detectors advantageously including respective vibration detectors and transducers adapted to convert a mechanical pressure into a proportional electric signal. The seismic detectors can be any of those used in the evaluation of seismic-wave energy and of particular value are the Hall-effect, piezoelectric and strain-gauge-type energy-measuring devices. The detectors may be provided within short-range transmitting means including bores drilled in the respective stratum. Additionally, preferably, relatively shallow recesses or bores closely adjacent the generating bores provide further registration points for receiving a substantially direct measurement of the normal energy attenuation. This principle is based upon the probability that no defects of the stratum at which the seismic-wave generators are provided, the seismic signals will be substantially affected by the structure between a respective seismic generator and the reference receiver closely spaced therefrom in a recess along the same surface. Even if minor defects are present in the shallow space between the detectors and their reference receivers, it is possible to average out the reference attenuation and nullify any such defects.

According to still another feature of this invention, the extent and orientation of the fault may be determined by spacing on one side of the stratum a number of sources having characteristic waves from one or more of the wave sources and registering the transmitted wave on separate receivers at a given distance or direction, while on the other side of the suspected fault, a similar or greater number of receivers are provided in spaced relationship. By determining which seismic waves deflected from a given generator reach a particular receiver it is possible to predict the actual direct-line path with the consequence that every generator with every receiver in a field of a specific sense; each of the generators or detectors is the center of a spaced field of transmission. In other words, if the group of defect structures is such that from the gap in the responses, it is possible to determine the extent, orientation and location of the fissure. The receivers themselves can be coupled to geophones provided with respective amplifiers and recording media for registering the detected energies. Still more preferably are valued to be considered with the detectors of a standard registration unit connected directly with the indicating means. The sources of seismic waves include, in addition to explosives and similar charges of the type commonly used in seismic investigations, pile drivers, drop hammers, pneumatic drills of the percussion type and like instruments. It is especially desirable when pneumatic and drop hammers or drills are employed or where rotary drills are used to exploit their rhythmic wave to produce their impact at a substantially constant rate. If several generators are employed, they are made as similar as possible, again insuring that the transmitted waves are practically uniform.

The above and other objects, features and advantages of the present invention will become more readily apparent from the following description, reference being made to the accompanying drawing in which:

FIG. 4 is an elevational view, greatly enlarged, of a system for receiving seismic signals in accordance with this invention; and FIG. 5 is a detail view of the system of FIG. 4.

Figure 1:
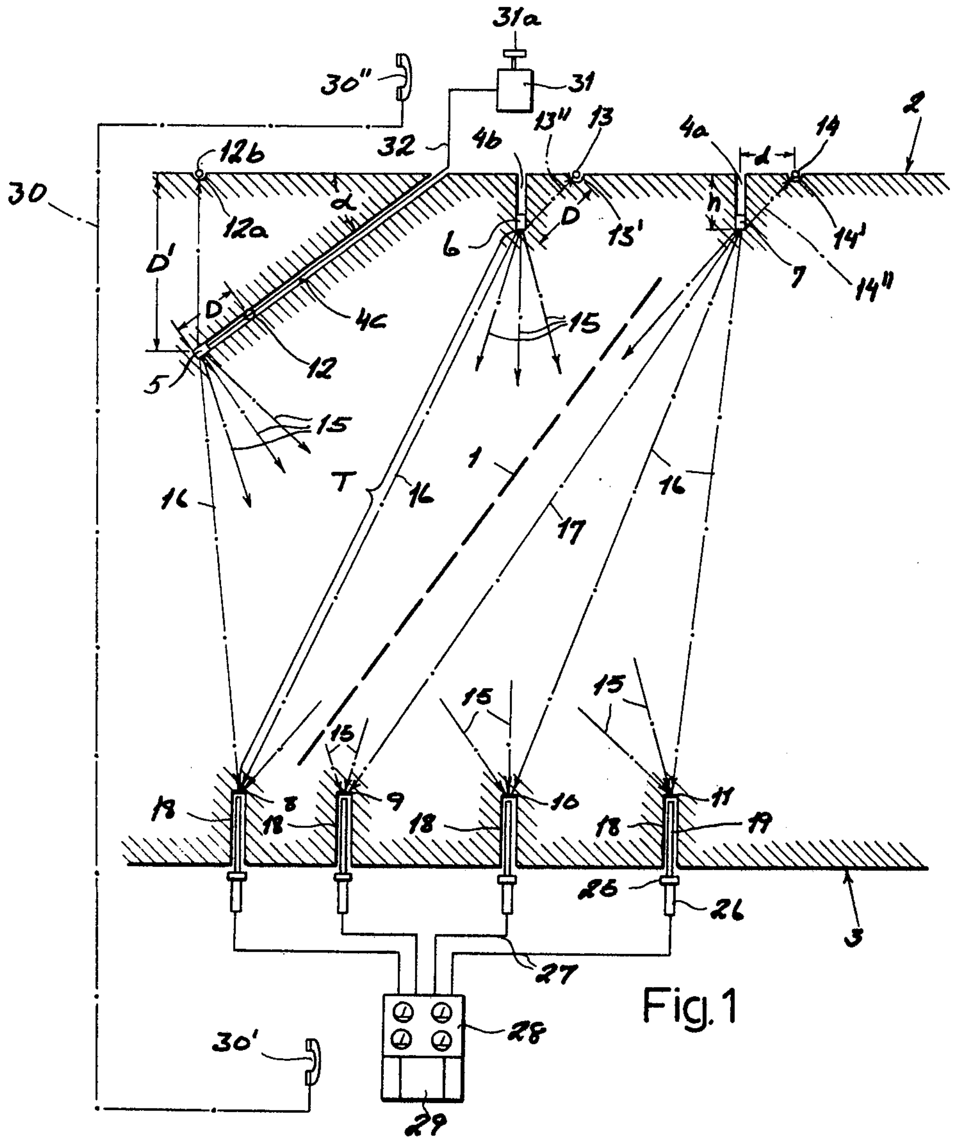
FIG. 1 is a diagrammatic cross-sectional view of an examining a stratum or coal seam between two horizontally spaced tunnels or a pair of vertically spaced tunnels.

The basic system of the present invention is illustrated diagrammatically in FIG. 1 wherein a tunnel wall or bore of substantially stratum is disposed between a pair of walls 2 and 3, respectively, and contains a fault plane represented at an inclination of any of the several defect structures mentioned above. This fault plane 1 can be represented in the horizontal zone of lower coherency within the stratum compared with transverse faults in the rock structure itself. Thus, a fault may be evidenced by zones of lesser strength or structural weakening of the stratum. Furthermore, the surfaces 2 and 3 can be horizontal or vertical and the substrate surfaces are to be detected in rock strata with irregular boundaries of opposite sides of the fault; the surfaces 2 and 3 will be considered to be merely diagrammatic for the purposes of the present description, the stratum can represent any one of a number of strata bounded by walls 2 and 3.

According to this invention, I provide a plurality of spaced-apart bores 4a, 4b, 4c etc. of relatively shallow depth that are bored perpendicular to the surface 2 and thus having a relatively long length but a shallow depth in comparison to those shown at 4a, 4b, 5, and 7. There are provided seismic-wave generators which may be piles or drive rods like the ordinary explosive charges detonated as represented for the charges 5, 5' detonated in bore 4b which is energized by a firing box 31 whose plug is shown at 31'. Upon detonation, shock waves or seismic waves are radiated from the charges 5, 5', 6 and 7 as represented by the arrows 15, 16 and 17 whose differences will be described in greater detail below.

To calibrate the energy of the respective discharges, recesses 33 and 44 are provided in the surface 2 at a known distance d from the vertical bores 4a and 4b; the depth h of each bore 4a, 4b is also known and thus, by the Pythagorean theorem, it is possible to calculate the distance D from each charge 5 and 6 to respective wave-registration stations 13 or 14. The latter may be formed of seismic detectors such as a standard geophone provided with a means indicating the energy of the direct seismic wave transmitted along the distance D represented at 13 and 14, respectively. A similar recess 12 can be provided with a seismic wave receiver 12 directly above the charge 5 when the length of the bore 4a and its length is known. In this case, the distance D through which the radiation wave must travel is a known value. I have also found it to be advantageous to determine the absolute intensity of the shock waves substantially unattenuated by passage through fault-free rock zones. In this case, a seismic wave receiver 12 is disposed in the bore 4c at a distance D from the charge 5.

On the other side of the fault 1, a plurality of receiver bores 18 are drilled into the rock stratum and can be considered to have registration points or receiving stations as represented at 8, 9, 10, 11 at the innermost ends of the bores. Each of the receivers is responsive to shock energy and may be a microphone-type transducer 25 to which an amplifier 26 is connected and which provides at 27 an electrical output signal proportional to the energy of the received seismic wave.

The electrical outputs from the geophones derived at 27 from the seismic-wave detectors 25, 26 is supplied to central indicating unit 28 having gauges or the like for displaying the respective seismic-wave energies sensed by the transducers. A strip recorder of the like may be provided in place of or in addition to indicating dials so as to register the changes in energy received per unit time. A camera 29 is also provided to record the positions of the meters or other registering medium. The meters are merely representative of any electrical output means providing a display which is proportional to the energy received by the transducer, such means including ammeters, lamps, and the like which are generally associated with timers and other devices providing an indication of time lapse and, therefore, distance.

To assure correlation between the individual supervising the measuring and indicating means 28, 29 and the individual responsible for the initiation of the seismic wave and the control of the seismic wave generators 5, 6 and 7, a telephone system connects the opposite sides of the stratum as represented by the dot-dash line 30 and the telephone receivers 30′ and 30″.

Figure 1A:
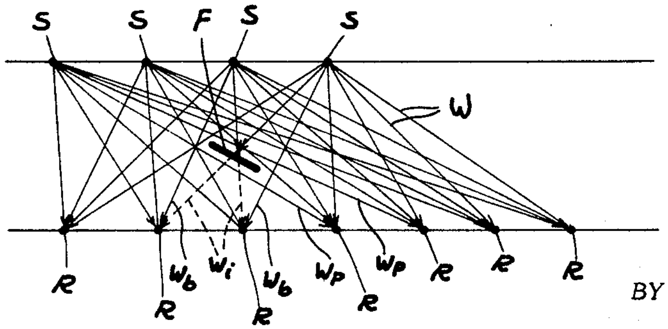

Referring now to FIG. 1*a*, in which the theory of the present invention is developed in general terms, it can be seen that a plurality of seismic wave sources S are spaced apart on one side of a stratum while a number of receivers R are spaced apart upon the other side of the stratum. Between each receiver R and each source S there is a single direct wave although from each source S a plurality of seismic waves W radiate toward a corresponding number of receivers R. Similarly, each receiver picks up a fan-like array of waves W emanating from the plurality of sources S. As a consequence, the stratum is swept by intersecting fans of waves and a fault F at any location in the stratum is likely to intercept some of the waves W (e.g. the waves $W_i$) and either cancel these waves or severely attenuate them. Furthermore, it is likely that the fault F will be substantially parallel to one or more waves (e.g. the waves $W_p$) and will be bracketed by others (e.g. the waves $W_b$) so that the orientation, longitudinal extent and configuration of the fault are detected. The thickness of the fault F is directly determined by the degree of attenuation of the energy of the seismic waves $W_i$ passing therethrough.

Figure 1B:
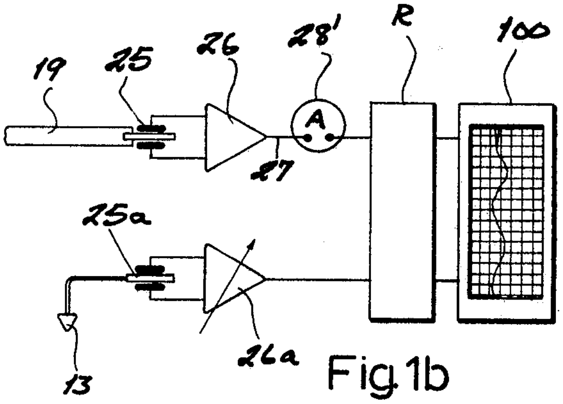

In FIG. 1*b*, it can be seen that a transducer of the geophone type 25 is activated by a rod 19 firmly anchored in the wall 3 of the stratum under study and has an output which is delivered to the respective amplifier 26, the latter being built into the transducer housing. The amplifier may supply the indicator meters 28′ via leads 27 for direct indication of the energy received. When, however, a measurement of the thickness of the fault or a comparative graphic representation is required, the amplifier 26 may feed a comparometer circuit represented at R; the latter is also fed by another transducer 25a whose pickup 13 represents the reference registration devices in the wall 2 of the stratum (see FIG. 1). In this case, a variable-gain amplifier 26a is used whose amplification (with respect to amplifier 26) is proportional to the ratio $T:D$ of the thickness T of the stratum along a respective direct wave and the distance D between the seismic source 6 and the reference indicator 13. The saturable reactor R may control a recorder 100 designed to represent the thickness or density of the fault F.

Similarly, the outputs of a number of detectors 25 may be combined on a multi-point recorder or the like.

In FIG. 1, the waves 15 are shown to be intercepted by the fault 1 while waves 16 are unintercepted and at least one wave 17 is the wave closest to the fault 1 which is unintercepted and therefore is parallel to the fault plane. When the present method is, accordingly, used to evaluate the roof of a mine tunnel or a support wall of a mine structure, these measurements of the extent, nature and orientation of the faults, are used to determine whether the walls and roof of the tunnel are sufficiently free from inclusions, weakened zones, clefts and the like to be effective in supporting the subsurface construction as the latter advances.

Figure 2:
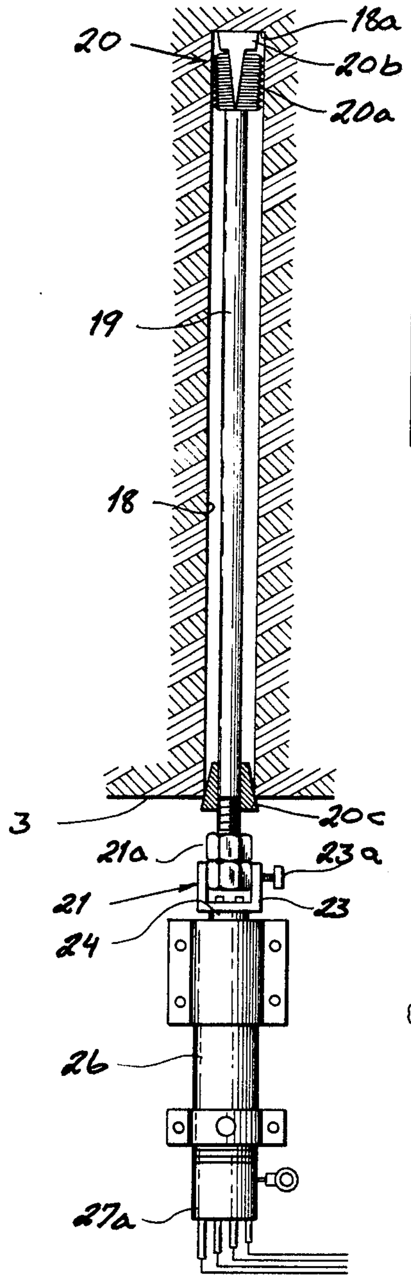
FIG. 2 is a graph illustrative of the invention.
Figure 3:
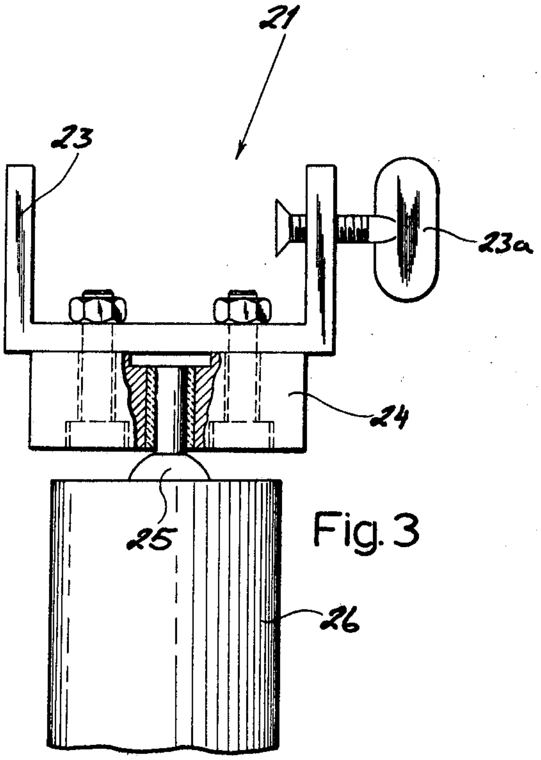
FIG. 3 is a block diagram illustrating some of the principles considered in this graph.

In FIGS. 2 and 3, I show a receiving station in which the rod 19 is anchored in the bore 18 of the stratum 3 by a conventional expansion device represented at 20. This expansion device can include an expansion sleeve 20a which is wedged outwardly by a tapered spreading member 20b, driven home when the rod 19 is forcibly inserted into the bore 18 to bear against the blind end 18a thereof. This method of anchoring the rod 19 in the exploratory bore 18 serves to effect shock and force transmission from the stratum to the rod without significant loss of energy or, at any rate, with a loss of seismic wave energy which is small compared with the energy attenuation in the fault. A further tapered sleeve 20c locks the rod 19 in the wall at its outer extremity.

At its outer extremity, a connecting device 21 is provided for releasably attaching the rod to a microphone-type transducer using the piezoelectric effect and represented at 25. For this purpose, a head 21a is threaded onto the rod 19 and is, in turn, locked in a yoke 23 by a clamping screw 23a. The yoke 23 forms a socket upon a microphone-supporting base which also carries, in a common housing, a the microphone pickup 25 and the amplifier 26. When the detector is designed to receive a plurality of timed pulses from respective generators, a plurality of microphone pickups are provided and are connected via respective amplifiers to the recording means. Each direct wave, therefore, can be individually analyzed. In this case, a multiconductor microphone cable connector is provided at 27a for attachment to the amplifier housing. When the rod 19 is relatively long, it is found that minor disturbances and interference phenomena bypass the receiver and are not detected so as to influence the measurements. It has also been found to be desirable, especially when the rods 19 are not to be removed, to embed the rods in the bores 18 with the aid of mortar, concrete or other adhesive of high compressive strength.

The invention as described and illustrated is believed to admit of many modifications which will be readily apparent to those skilled in the art and are intended to be included within the spirit and scope of the appended claims.

I claim:

1. A method of directing the presence or analyzing the extent of structural defects in subsurface rock strata comprising the steps of:

(a) generating at least at one side of the suspected defect in said stratum a seismic wave projected through said strata and toward the suspected defect;

(b) receiving on an opposite side of said defect direct seismic waves transmitted through said strata;

(c) comparing the energy attenuation of the received seismic waves with the normal energy attenuation of said strata to ascertain the extent and nature of any defects within the strata radiated by said seismic wave in the path thereof;

(d) detecting the seismic wave generated in step (a) along the same side of said defect as said wave is generated and through said strata a short distance from the point at which said wave is generated to provide an indication of the normal energy attenuation of said strata in the absence of said defect; and (e) using the normal attenuation rate so established for comparison with the attenuation of the seismic wave transradiating said strata in step (c).

2. A method as defined in claim 1 wherein said strata contains a crevice of relatively small width in addition to said defect, said seismic waves having a wave length greater than the width of said crevices.

3. A method as defined in claim 1, wherein respective seismic waves are generated along said one side of said defect in said strata at spaced apart locations and respective direct seismic waves are received at said other side of said defect at spaced-apart stations, further comprising the step of determining the extent of said defect by analyzing the received waves to ascertain which of the direct waves have been intercepted by said defect.

4. A system for detecting the presence or analyzing the extent of structural defects in subsurface rock strata, comprising:

at least one seismic-wave generator disposed at one side of a suspected defect in said strata for generating a seismic wave and projecting it through said strata toward the suspected defect;

at least one seismic-wave receiver disposed on the other side of said suspected defect for receiving direct seismic waves transmitted through said strata and transradiating the region of said suspected defect;

means connected with said receiver for analyzing the energy of the direct seismic waves affecting said receiver whereby the extent and nature of the defects can be ascertained from the attenuation of the energy of the direct seismic waves passing between said source and said receiver; and a probe responsive to seismic-wave energy and disposed at said strata adjacent said source but spaced therefrom for receiving direct seismic waves emanating from said source at said one side of said defect.

5. A system as defined in claim 4 wherein said station includes a bore extending into said strata from said other side and containing means responsive to seismic-wave energy, said source including at least one bore extending into said strata from said one side of said defect and containing a generator of seismic waves.

6. A system as defined in claim 4 wherein said receiver includes a vibration/electrical transducer disposed externally of said strata and a rod connected with said transducer and extending into the bore of said station.

7. A system as defined in claim 6, further comprising anchor means for rigidly fixing said rod in said bore of said station, and releasably clamping means for connecting said rod with said transducer.

8. A system as defined in claim 7, wherein said receiver includes a housing containing at least one microphone pickup, said clamping means being provided proximal to said microphone pickup whereby said rod transmits vibrations to said microphone pickup, an amplifier in said housing connected with said microphone pickup and means for delivering an electrical output proportional to the energy detected by said receiver to a central information collecting station.

9. A system as defined in claim 4 wherein a plurality of said sources are provided along one side of said defect and a plurality of said receivers are provided along said other side of said defect, said receivers and said sources being mutually spaced apart, further comprising recording means for collectively indicating the energy of direct waves picked up by said receivers from said sources.

References Cited

UNITED STATES PATENTS

| | | | |
|---|---|---|---|
| 1,767,242 | 6/1930 | Kiefer | 340—17 |
| 2,074,161 | 3/1937 | Bills | 181—5 |
| 2,149,427 | 3/1939 | Faust | 181—5 |
| 2,364,655 | 12/1944 | Pratley | 181—5 |
| 2,483,770 | 10/1949 | Hildebrandt | 340—17 |
| 2,902,107 | 9/1959 | Erat et al. | 340—15.5 |

SAMUEL FEINBERG, *Primary Examiner.*

U.S. Cl. X.R.

340—17